United States Patent
Okahisa et al.

(10) Patent No.: US 11,965,077 B2
(45) Date of Patent: Apr. 23, 2024

(54) ANTI-VIBRATION RUBBER COMPOSITION AND ANTI-VIBRATION RUBBER MEMBER

(71) Applicant: Sumitomo Riko Company Limited, Aichi (JP)

(72) Inventors: Masashi Okahisa, Aichi (JP); Seiji Kasai, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 575 days.

(21) Appl. No.: 17/192,857

(22) Filed: Mar. 4, 2021

(65) Prior Publication Data

US 2021/0206944 A1      Jul. 8, 2021

Related U.S. Application Data

(63) Continuation of application No. PCT/JP2019/035149, filed on Sep. 6, 2019.

(30) Foreign Application Priority Data

Sep. 26, 2018   (JP) ................. 2018-179652

(51) Int. Cl.
| | | |
|---|---|---|
| C08K 5/25 | (2006.01) | |
| C08K 3/04 | (2006.01) | |
| C08K 3/36 | (2006.01) | |
| C08K 5/27 | (2006.01) | |
| C08K 5/5415 | (2006.01) | |
| C08K 5/548 | (2006.01) | |
| C08L 7/00 | (2006.01) | |
| C08L 9/00 | (2006.01) | |
| F16F 1/36 | (2006.01) | |
| F16F 15/08 | (2006.01) | |

(52) U.S. Cl.
CPC ............... *C08K 5/25* (2013.01); *C08K 3/04* (2013.01); *C08K 3/36* (2013.01); *C08K 5/27* (2013.01); *C08K 5/5415* (2013.01); *C08K 5/548* (2013.01); *C08L 7/00* (2013.01); *C08L 9/00* (2013.01); *F16F 1/3605* (2013.01); *F16F 15/08* (2013.01); *F16F 2224/025* (2013.01); *F16F 2226/02* (2013.01)

(58) Field of Classification Search
CPC .................... C08K 5/25; C08K 3/36
See application file for complete search history.

(56) References Cited

U.S. PATENT DOCUMENTS

| 9,296,873 B2 | 3/2016 | Koyama | |
| 11,208,331 B2 * | 12/2021 | Imabeppu | ............... C08K 3/36 |
| 2017/0204248 A1 | 7/2017 | Ochiai | |

FOREIGN PATENT DOCUMENTS

| CN | 103360637 | | 10/2013 |
|---|---|---|---|
| CN | 107522906 | | 12/2017 |
| DE | 102014111306 | | 4/2015 |
| EP | 3243872 | | 11/2017 |
| JP | 2009096980 | | 5/2009 |
| JP | 2009256580 | | 11/2009 |
| JP | 2011126992 A | * | 6/2011 |
| JP | 2013147581 A | * | 8/2013 |
| JP | 2015224279 | | 12/2015 |
| JP | 2016124880 | | 7/2016 |
| JP | 2017119873 | | 7/2017 |
| JP | 2018095810 | | 6/2018 |

OTHER PUBLICATIONS

Machine translation of JP 2011126992-A (Jun. 2011, 8 pages).*
Machine translation of JP 2013147581-A (Aug. 2013, 6 pages).*
"International Search Report (Form PCT/ISA/210) of PCT/JP2019/035149", dated Nov. 26, 2019, with English translation thereof, pp. 1-4.
Office Action of China Counterpart Application, with English translation thereof, dated Aug. 24, 2022, pp. 1-15.
Office Action of Deutsches Counterpart Application, with English translation thereof, dated Aug. 26, 2022, pp. 1-13.
"Office Action of China Counterpart Application", dated Nov. 1, 2022, with English translation thereof, pp. 1-10.

* cited by examiner

*Primary Examiner* — Brieann R Johnston
(74) *Attorney, Agent, or Firm* — JCIPRNET

(57) ABSTRACT

An anti-vibration rubber composition contains: a polymer comprising component (A); and components (B) to (E). The mixing ratio of the components (B) and (C) is in a range of (B)/(C)=99/1 to 96/4 in weight ratio. As a result, it becomes possible to achieve a low dynamic magnification and to achieve both durability and weather resistance at a high level.

(A) diene rubber;
(B) silica;
(C) carbon black;
(D) silane coupling agent;
(E) dihydrazide compound represented by general formula (1).

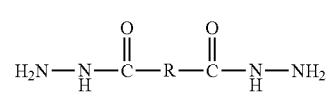

[in general formula (1), R represents an alkylene group having 1 to 30 carbon atoms, a cycloalkylene group having 1 to 30 carbon atoms, or a phenylene group].

7 Claims, No Drawings

ANTI-VIBRATION RUBBER COMPOSITION AND ANTI-VIBRATION RUBBER MEMBER

CROSS-REFERENCE TO RELATED APPLICATIONS

This application is a continuation application of International Application number PCT/JP2019/035149 on Sep. 6, 2019, which claims the priority benefit of Japan Patent Application No. 2018-179652, filed on Sep. 26, 2018. The entirety of each of the above—mentioned patent applications is hereby incorporated by reference herein and made a part of this specification.

BACKGROUND

Technical Field

The present disclosure relates to an anti-vibration rubber composition and an anti-vibration rubber member used for anti-vibration application in vehicles such as automobiles and trains.

Related Art

In the technical field of anti-vibration rubber, high durability, suppression of the increase in loss coefficient tan δ (loss factor) and low dynamic magnification (reduction of a value of dynamic magnification [dynamic spring constant (Kd)/static spring constant (Ks)]) are required. It is generally said that the content, particle size, dispersibility, interaction with a polymer and the like of a filler blended in the anti-vibration rubber composition greatly contribute as a control factor for realizing the requirements.

As the filler, carbon black, silica or the like is usually used because of the high performance as a reinforcement material (for example, see patent literatures 1 to 4).

LITERATURE OF RELATED ART

Patent Literature

Patent literature 1: Japanese Patent Laid-Open No. 2017-119873
Patent literature 2: Japanese Patent Laid-Open No. 2015-224279
Patent literature 3: Japanese Patent Laid-Open No. 2018-95810
Patent literature 4: Japanese Patent Laid-Open No. 2016-124880

However, in the technical field of the anti-vibration rubber, in particular, it is difficult to suppress the increase in dynamic magnification of the anti-vibration rubber by the filler and to achieve both durability (durability against a compression tensile test) and weather resistance (including ozone resistance or the like), and it is required to achieve both of the properties at a high level.

The present disclosure has been made in view of the above circumstances, and provides an anti-vibration rubber composition and an anti-vibration rubber member capable of achieving low dynamic magnification and achieving both durability and weather resistance at a high level.

SUMMARY

The present disclosure is shown as the following [1] to [7].

[1] An anti-vibration rubber composition, containing: a polymer comprising component (A); and components (B) to (E), wherein the mixing ratio of the components (B) and (C) is in a range of (B)/(C)=99/1 to 96/4 in weight ratio,
(A) diene rubber;
(B) silica;
(C) carbon black;
(D) silane coupling agent;
(E) dihydrazide compound represented by general formula (1).

[Chemical formula 1]

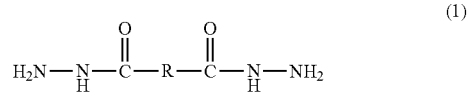

(1)

[in general formula (1), R represents an alkylene group having 1 to 30 carbon atoms, a cycloalkylene group having 1 to 30 carbon atoms, or a phenylene group]

[2] The anti-vibration rubber composition according to [1], wherein the content ratio of the silica (B) is in a range of 5 to 100 parts by weight with respect to 100 parts by weight of the diene rubber (A).

[3] The anti-vibration rubber composition according to [1] or [2], wherein the silica (B) has a BET specific surface area of 30 to 320 $m^2/g$.

[4] The anti-vibration rubber composition according to any one of [1] to [3], wherein the silane coupling agent (D) is at least one selected from a sulfide-based silane coupling agent and a mercapto-based silane coupling agent.

[5] The anti-vibration rubber composition according to any one of [1] to [4], wherein the content ratio of the dihydrazide compound (E) is in a range of 0.01 to 5.0 parts by weight with respect to 100 parts by weight of the diene rubber (A).

[6] The anti-vibration rubber composition according to any one of [1] to [5], wherein the dihydrazide compound (E) is at least one selected from adipic acid dihydrazide and isophthalic acid dihydrazide.

[7] An anti-vibration rubber member, comprising a vulcanized body of the anti-vibration rubber composition according to any one of [1] to [6].

DESCRIPTION OF THE EMBODIMENTS

That is, the present inventors have conducted intensive studies to solve the above problems. In the process of the study, the present inventors examined to combine the silica and the carbon black as fillers in the diene rubber which is a polymer of the anti-vibration rubber composition, and further examined to improve the dispersibility of the silica by combination use of the dihydrazide compound and the silane coupling agent that are represented by general formula (1). Then, it was found that based on the above configuration, when the mixing ratio of silica/carbon black is set to be in the range of 99/1 to 96/4 in weight ratio, the increase in dynamic magnification can be suppressed and both durability (durability against a compression tensile test) and weather resistance (including ozone resistance or the like) can be achieved at a high level.

As described above, the anti-vibration rubber composition of the present disclosure contains a polymer comprising a diene rubber (A) and also contains a silica (B), a carbon black (C), a silane coupling agent (D), and a dihydrazide compound (E) represented by general formula (1), and the mixing ratio of the silica (B) and the carbon black (C) is in a specific range. Therefore, it is possible to achieve low dynamic magnification and to achieve both durability and weather resistance at a high level.

Next, embodiments of the present disclosure are described in detail. However, the present disclosure is not limited to the embodiments.

As described above, the anti-vibration rubber composition of the present disclosure contains a polymer comprising component (A) and also contains components (B) to (E), and the mixing ratio of the component (B) and the component (C) is in a range of (B)/(C)=99/1 to 96/4 in weight ratio.
 (A) diene rubber;
 (B) silica;
 (C) carbon black;
 (D) silane coupling agent;
 (E) dihydrazide compound represented by general formula (1).

[Chemical formula 2]

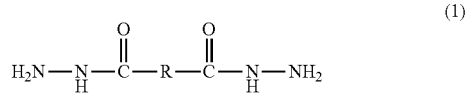

(1)

[in general formula (1), R represents an alkylene group having 1 to 30 carbon atoms, a cycloalkylene group having 1 to 30 carbon atoms, or a phenylene group]

In the anti-vibration rubber composition of the present disclosure, from the viewpoint of suppressing the increase in dynamic magnification and achieving both durability and weather resistance at a high level, it is particularly important that the mixing ratio (weight ratio) of the silica (B) and the carbon black (C) is set to be in a range of (B)/(C)=99/1 to 96/4 as described above. Besides, from the same viewpoint, the weight ratio [(B)/(C)] is preferably in a range of 98.5/1.5 to 96/4, and more preferably in a range of 98/2 to 96/4. That is, the reason is that if the ratio of the carbon black (C) is too large, the dynamic magnification is improved or the durability (durability against a compression tensile test) or the like becomes inferior, and conversely, if the ratio of the carbon black (C) is too small, the weather resistance or the like becomes inferior.

Hereinafter, the constituent materials of the anti-vibration rubber composition of the present disclosure are described in detail.

[Diene Rubber (A)]

As described above, the anti-vibration rubber composition of the present disclosure uses the polymer comprising the diene rubber (A), and does not use a polymer other than the diene rubber (A). As the diene rubber (A), a diene rubber containing a natural rubber (NR) as a main component is preferably used. Here, the "main component" means that 50% by weight or more of the diene rubber (A) is the natural rubber, and also means that the diene rubber (A) comprises only the natural rubber. In this way, by using a natural rubber as the main component, the diene rubber (A) becomes excellent in strength, low dynamic magnification or the like.

Further, diene rubbers other than the natural rubber include, for example, a butadiene rubber (BR), a styrene-butadiene rubber (SBR), an isoprene rubber (IR), an acrylonitrile-butadiene rubber (NBR), an ethylene-propylene-diene rubber (EPDM), a butyl rubber (IIR) and a chloroprene rubber (CR), and the like. These rubbers are used alone, or two or more of the rubbers are used in combination. In addition, it is desirable to use these diene rubbers in combination with a natural rubber.

[Silica (B)]

Next, as the silica (B), for example, a wet silica, a dry silica, a colloidal silica, or the like are used. Besides, these silicas are used alone, or two or more of the silicas are used in combination.

Then, from the viewpoint of further achieving high durability, suppression of the increase in loss factor and lower dynamic magnification, the BET specific surface area of the silica (B) is preferably 30 to 320 m²/g, and a silica having a BET specific surface area of 50 to 230 m²/g is more preferable.

In addition, for example, the BET specific surface area of the silica (B) can be measured by a BET specific surface area measuring device (manufactured by Micro Data Co., Ltd., 423241), using a mixed gas (N₂: 70%, He: 30%) as an adsorption gas after a sample is degassed at 200° C. for 15 minutes.

Further, from the viewpoint of further achieving high durability, suppression of the increase in loss factor and lower dynamic magnification, the content of the silica (B) is preferably 5 to 100 parts by weight and more preferably 20 to 60 parts by weight with respect to 100 parts by weight of the diene rubber (A).

In addition, it is necessary to specify the content of the silica (B) after the mixing ratio (weight ratio) of the silica (B) and the carbon black (C) specified in the present disclosure as described above is satisfied.

[Carbon Black (C)]

From the viewpoint of improving weather resistance, as the carbon black (C) used together with the silica (B), various grades of carbon blacks are used, such as SAF class, ISAF class, HAF class, MAF class, FEF class, GPF class, SRF class, FT class, and MT class. These carbon blacks are used alone, or two or more of the carbon blacks are used in combination.

Besides, from the viewpoint of durability and low dynamic magnification, the carbon black (C) preferably has an iodine adsorption amount of 10 to 100 mg/g and a DBP oil absorption amount of 30 to 180 ml/100 g.

In addition, the iodine adsorption amount of the carbon black (C) is a value measured in accordance with JIS K 6217-1 (method A). Further, the DBP oil absorption amount of the carbon black (C) is a value measured in accordance with JIS K 6217-4.

From the viewpoint of further achieving both durability and weather resistance, the content of the carbon black (C) is preferably 0.1 to 5 parts by weight and more preferably 0.1 to 3 parts by weight with respect to 100 parts by weight of the diene rubber (A).

In addition, it is necessary to specify the content of the carbon black (C) after the mixing ratio (weight ratio) of the silica (B) and the carbon black (C) specified in the present disclosure as described above is satisfied.

[Silane Coupling Agent (D)]

As described above, the anti-vibration rubber composition of the present disclosure contains the silane coupling agent (D), and thus the silica (B) and the diene rubber (A) are bonded via the silane coupling agent (D), and the durability of the anti-vibration rubber can be further improved.

As the silane coupling agent (D), for example, a mercapto-based silane coupling agent, a sulfide-based silane coupling agent, an amine-based silane coupling agent, an epoxy-based silane coupling agent, a vinylic silane coupling agent and the like are used alone, or two or more of the silane coupling agents are used in combination. Particularly, the silane coupling agent (D) is preferably a mercapto-based silane coupling agent or a sulfide-based silane coupling agent because the vulcanization density is increased and there is particularly an effect in low dynamic magnification and durability.

The mercapto-based silane coupling agent may be, for example, 3-mercaptopropyltrimethoxysilane, 3-mercaptopropyltriethoxysilane, or the like. These mercapto-based silane coupling agents are used alone, or two or more of the mercapto-based silane coupling agents are used in combination.

The sulfide-based silane coupling agent may be, for example, bis-(3-(triethoxysilyl)-propyl)-disulfide, bis (3-triethoxysilylpropyl) trisulfide, bis-(3-(triethoxysilyl)-propyl)-tetrasulfide, bis (3-trimethoxysilylpropyl) disulfide, bis (2-triethoxysilylethyl) tetrasulfide, bis (2-trimethoxysilylethyl) tetrasulfide, bis (3-triethoxysilylpropyl) disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropyl benzothiazolyl tetrasulfide, 3-triethoxysilylpropyl benzothiazole tetrasulfide, 3-triethoxysilylpropyl methacrylate monosulfide, 3-trimethoxysilylpropyl methacrylate monosulfide, or the like. These sulfide-based silane coupling agents are used alone, or two or more of the sulfide-based silane coupling agents are used in combination.

The amine-based silane coupling agent may be, for example, 3-aminopropyltriethoxy silane, 3-aminopropyltrimethoxy silane, N-(2-aminoethyl)-3-aminopropyltrimethoxysilane, N-(2-aminoethyl)-3-aminopropylmethyldimethoxysilane, 3-(N-phenyl) aminopropyltrimethoxysilane, or the like. These amine-based silane coupling agents are used alone, or two or more of the amine-based silane coupling agents are used in combination.

The epoxy-based silane coupling agent may be, for example, 2-(3,4-epoxycyclohexyl) ethyltrimethoxysilane, 3-glycidoxypropyltrimethoxysilane, 3-glycidoxypropylmethyldiethoxysilane, 3-glycidoxypropyltriethoxysilane, 3-glycidoxypropylmethyldimethoxysilane, or the like. These epoxy-based silane coupling agents are used alone, or two or more of the epoxy-based silane coupling agents are used in combination.

The vinylic silane coupling agent may be, for example, vinyltriethoxysilane, vinyltrimethoxysilane, vinyl tris (β-methoxyethoxy) silane, vinyldimethylchlorosilane, vinyltrichlorosilane, vinyl triisopropoxysilane, vinyl tris (2-methoxyethoxy) silane, or the like. These vinylic silane coupling agents are used alone, or two or more of the vinylic silane coupling agents are used in combination.

From the viewpoint of excellence in low dynamic magnification, durability and the like, the content of these silane coupling agents (D) is preferably 0.5 to 20 parts by weight and more preferably 1.0 to 10 parts by weight with respect to 100 parts by weight of the diene rubber (A).

[Dihydrazide Compound (E)]

As described above, the anti-vibration rubber composition of the present disclosure contains the dihydrazide compound (E) represented by general formula (1), and thus the dispersibility of the silica (B) is improved, and as a result, the increase in dynamic magnification can be effectively suppressed.

[Chemical formula 3]

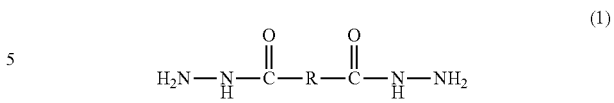

[in general formula (1), R represents an alkylene group having 1 to 30 carbon atoms, a cycloalkylene group having 1 to 30 carbon atoms, or a phenylene group]

Specific examples of the dihydrazide compound (E) include, for example, adipic acid dihydrazide, isophthalic acid dihydrazide, phthalic acid dihydrazide, terephthalic acid dihydrazide, succinic acid dihydrazide, azelaic acid dihydrazide, sebacic acid dihydrazide, oxalic acid dihydrazide, dodecanoic acid dihydrazide, and the like. These dihydrazide compounds are used alone, or two or more of the dihydrazide compounds are used in combination. Particularly, adipic acid dihydrazide and isophthalic acid dihydrazide are preferable from the viewpoint of lowering dynamic magnification.

From the viewpoint of low dynamic magnification and the like, the content of the dihydrazide compound (E) is preferably 0.01 to 5.0 parts by weight and more preferably 0.01 to 3 parts by weight with respect to 100 parts by weight of the diene rubber (A).

In addition, in the anti-vibration rubber composition of the present disclosure, together with the above components (A) to (E) which are essential components, a vulcanization agent, a vulcanization accelerator, a vulcanization aid, an antioxidant, a process oil, and the like may be appropriately contained as necessary.

The vulcanization agent may be, for example, sulfur (powder sulfur, precipitated sulfur, insoluble sulfur), sulfur-containing compounds such as alkylphenol disulfide, or the like. These vulcanization agents are used alone, or two or more of the vulcanization agents are used in combination.

Further, the content of the vulcanization agent is preferably in a range of 0.1 to 10 parts by weight and more preferably in a range of 0.3 to 5 parts by weight with respect to 100 parts by weight of the diene rubber (A). That is, the reason is that if the content of the vulcanization agent is too small, the vulcanization reactivity tends to deteriorate, and conversely, if the content of the vulcanization agent is too large, the rubber property (breaking strength, breaking elongation) tends to decline.

The vulcanization accelerator may be, for example, a thiuram-based vulcanization accelerator, a sulfenamide-based vulcanization accelerator, a guanidine-based vulcanization accelerator, a thiazole-based vulcanization accelerator, an aldehyde ammonia-based vulcanization accelerator, an aldehyde amine-based vulcanization accelerator, a thiourea-based vulcanization accelerator, or the like. These vulcanization accelerators are used alone, or two or more of the vulcanization accelerators are used in combination. Particularly, from the viewpoint of excellence in compression permanent strain, a combination of the thiuram-based vulcanization accelerator and at least one selected from the sulfenamide-based vulcanization accelerator, the guanidine-based vulcanization accelerator and the thiazole-based vulcanization accelerator is preferable.

Further, the content of the vulcanization accelerator is preferably in a range of 0.1 to 10 parts by weight and more preferably in a range of 0.3 to 5 parts by weight with respect to 100 parts by weight of the diene rubber (A).

The thiuram-based vulcanization accelerator may be, for example, tetramethylthiuram disulfide (TMTD), tetraethylthiuram disulfide (TETD), tetrabutylthiuram disulfide (TBTD), tetrakis (2-ethylhexyl) thiuram disulfide (TOT), tetrabenzylthiuram disulfide (TBzTD), or the like.

The sulfenamide-based vulcanization accelerator may be, for example, N-oxydiethylene-2-benzothiazolyl sulfenamide (NOBS), N-cyclohexyl-2-benzothiazolyl sulfenamide (CBS), N-t-butyl-2-benzothiazole sulfenamide (BBS), N,N'-dicyclohexyl-2-benzothiazole sulfenamide, or the like. These sulfenamide-based vulcanization accelerators are used alone, or two or more of the sulfenamide-based vulcanization accelerators are used in combination.

The guanidine-based vulcanization accelerator may be, for example, N,N'-diphenylthiourea, trimethylthiourea, N,N'-diethylthiourea, N,N'-dibutylthiourea, or the like. These guanidine-based vulcanization accelerators are used alone, or two or more of the guanidine-based vulcanization accelerators are used in combination.

The thiazole-based vulcanization accelerator may be, for example, dibenzothiazyl disulfide (MBTS), 2-mercaptobenzothiazole (MBT), 2-mercaptobenzothiazole sodium salt (NaMBT), 2-mercaptobenzothiazole zinc salt (ZnMBT), or the like. These thiazole-based vulcanization accelerators are used alone, or two or more of the thiazole-based vulcanization accelerators are used in combination. Particularly, dibenzothiazyl disulfide (MBTS) and 2-mercaptobenzothiazole (MBT) are preferably used in terms of especially excellent vulcanization reactivity.

The vulcanization aid may be, for example, zinc oxide (ZnO), stearic acid, magnesium oxide, or the like. These vulcanization aids are used alone, or two or more of the vulcanization aids are used in combination.

Further, the content of the vulcanization aid is preferably in a range of 0.1 to parts by weight and particularly preferably in a range of 0.3 to 7 parts by weight with respect to 100 parts by weight of the diene rubber (A).

The antioxidant may be, for example, a carbamate-based antioxidant, a phenylendiamine-based antioxidant, a phenol-based antioxidant, a diphenylamine-based antioxidant, a quinoline-based antioxidant, an imidazole-based antioxidant, a wax type, or the like. These antioxidants are used alone, or two or more of the antioxidants are used in combination.

Further, the content of the antioxidant is preferably in a range of 0.5 to 15 parts by weight and particularly preferably in a range of 1 to 10 parts by weight with respect to 100 parts by weight of the diene rubber (A).

The process oil may be, for example, a naphthenic oil, a paraffinic oil, an aroma oil, or the like. These process oils are used alone, or two or more of the process oils are used in combination.

Further, the content of the process oil is preferably in a range of 1 to 35 parts by weight and particularly preferably in a range of 3 to 30 parts by weight with respect to 100 parts by weight of the diene rubber (A).

[Method for Preparing Anti-Vibration Rubber Composition]

Here, the anti-vibration rubber composition of the present disclosure can be prepared by using a kneading machine such as a kneader, a banbury mixer, an open roll and a twin-screw stirrer to knead components (A) to (E) which are essential components and knead other materials listed above as necessary.

The anti-vibration rubber composition of the present disclosure obtained in this way is vulcanized at a high temperature (150° C. to 170° C.) for 5 to 30 minutes to become an anti-vibration rubber member (vulcanized body).

Besides, the anti-vibration rubber member including a vulcanized body of the anti-vibration rubber composition of the present disclosure is preferably used as a constituent member of an engine mount, a stabilizer bush, a suspension bush, a motor mount, a subframe mount and the like which are used in an automobile vehicle or the like. Particularly, because of low dynamic magnification and excellent durability, the anti-vibration rubber member can be advantageously used as a constituent member (anti-vibration rubber member for electric vehicle) of a motor mount, a suspension bush, a subframe mount and the like used in an electric vehicle powered by an electric motor (including fuel cell vehicle (FCV), plug-in hybrid vehicle (PHV), hybrid vehicle (HV) and the like besides electric vehicle (EV)).

Further, in addition to the above applications, the anti-vibration rubber member can also be used for a seismic control (vibration control) device and a seismic isolation device such as a vibration control damper on computer hard disks, a vibration control damper on general home appliances such as a washing machine, and a seismic control wall or a seismic control (vibration control) damper for construction in the field of construction and housing.

EXAMPLE

Next, examples are described along with comparison examples. However, the present disclosure is not limited to these examples.

First, prior to examples and comparison examples, the following materials are prepared. In addition, each measured value of the carbon black and the silica is a value measured according to the above method.

[Natural Rubber (NR)]
[Isoprene Rubber (IR)]
Nipol IR 2200 manufactured by Zeon Corporation
[Butadiene Rubber (BR)]
Nipol 1220 manufactured by Zeon Corporation
[Zinc Oxide]
Two types of zinc oxide manufactured by Sakai Chemical Industry Co., Ltd.
[Stearic Acid]
Beads stearic acid Sakura manufactured by Nof Corporation
[Antioxidant]
Antigen 6C manufactured by Sumitomo Chemical Co., Ltd.
[Silica (i)]
Nipsil VN3 (BET specific surface area: 180 to 230 $m^2/g$) manufactured by Tosoh Silica Corporation
[Silica (ii)]
Nipsil ER (BET specific surface area: 70 to 120 $m^2/g$) manufactured by Tosoh Silica Corporation
[Carbon Black]
Show Black N330 (DBP oil absorption amount: 104 ml/100 g, iodine adsorption amount: 81 mg/g) manufactured by Cabot Japan Co., Ltd.
[Process Oil]
Sunthene 410 manufactured by Japan Sun Oil Co., Ltd.
[Dihydrazide (i)]
Adipic acid dihydrazide (ADH) manufactured by Otsuka Chemical Co., Ltd.
[Dihydrazide (ii)]
Isophthalic acid dihydrazide (IDH) manufactured by Otsuka Chemical Co., Ltd.
[Silane Coupling Agent (i)]

Sulfide-based silane coupling agent (Si-69 manufactured by EVONIK DEGUSSA)

[Silane Coupling Agent (ii)]

NXT Z45 manufactured by MOMENTIVE

[Vulcanization Accelerator]

Sanceler CZ-G manufactured by Sanshin Chemical Industry Co., Ltd.

[Sulfur (Vulcanization Agent)]

Manufactured by Karuizawa Seirenjo

Examples 1 to 14 and Comparison Examples 1 to 3

The anti-vibration rubber composition was prepared by blending and kneading each of the above materials in the ratio shown in tables 1 and 2 below. In addition, in the above kneading, first, materials other than the vulcanization agent and the vulcanization accelerator were kneaded at 140° C. for 5 minutes by using a banbury mixer, and then the vulcanization agent and the vulcanization accelerator were blended and kneaded at 60° C. for 5 minutes by using an open roll.

The anti-vibration rubber composition of examples and the anti-vibration rubber composition of comparison examples obtained in this way were used to evaluate each property according to the following criterion. The results are also shown in tables 1 and 2 below.

<Dynamic Magnification>

Each anti-vibration rubber composition was press-molded (vulcanized) to prepare a test piece. Then, the static spring constant (Ks) of the test piece was measured according to JIS K 6394, and the dynamic spring constant (Kd100) of the test piece at a frequency of 100 Hz was obtained according to JIS K 6385. Based on the above values, the dynamic magnification (Kd100/Ks) was calculated.

Tables 1 and 2 below show a measured value of dynamic magnification in each example which is converted into an index when the measured value of the dynamic magnification (Kd100/Ks) in comparison example 1 is set to 100.

Then, it was evaluated as "◯" when the value of dynamic magnification of the examples is lower than that of comparison example 1, and it was evaluated as "x" when the value of dynamic magnification of the examples is equal to or higher than that of comparison example 1.

<Durability>

Each anti-vibration rubber composition was press-molded (vulcanized) under the condition of 150° C.×30 minutes to prepare a rubber sheet having a thickness of 2 mm. Then, a JIS No. 3 dumbbell was punched out from the rubber sheet, and a dumbbell fatigue test (expansion test) was performed using the dumbbell according to JIS K 6260. Then, the number of expansion at break (the number of times at break) was measured.

Tables 1 and 2 below show a measured value of the number of times at break in each example which is converted into an index when the measured value of the number of times at break in comparison example 1 is set to 100.

Then, it was evaluated as "◯" when the value of the number of times at break (index conversion value) is equal to or higher than 90 (equal to or higher than that of comparison example 1), and it was evaluated as "x" when the value of the number of times at break is less than 90.

<Weather Resistance>

Each anti-vibration rubber composition was press-molded (vulcanized) under the condition of 150° C.×30 minutes to prepare a rubber sheet having a thickness of 2 mm. Then, a test piece having a width of 50 mm and a length of 50 mm was prepared from the above rubber sheet, and a weather resistance test was performed by exposing the test piece to a sunshine weather meter (manufactured by Toyo Seiki Seisakusho Co., Ltd., Atlas Weather-Ometer Ci4000, black panel temperature 63° C.) for 48 hours.

Then, the color change of the test piece after the weather resistance test was visually evaluated by comparison with the test piece before the weather resistance test, and the test piece in which the color change is not felt was evaluated as "◯" and the test piece in which the color change is felt was evaluated as "x". In addition, the above visual evaluation was performed by 10 panelists, and the evaluation results based on the consensus of 8 or more out of the 10 people are shown in tables 1 and 2 below.

TABLE 1

|  | Examples | | | | | | | |
|---|---|---|---|---|---|---|---|---|
|  | 1 | 2 | 3 | 4 | 5 | 6 | 7 | 8 |
| NR | 100 | 100 | 100 | 100 | 100 | 100 | 100 | 100 |
| IR | — | — | — | — | — | — | — | — |
| BR | — | — | — | — | — | — | — | — |
| Zinc oxide | 5 | 5 | 5 | 5 | 5 | 5 | 5 | 5 |
| Stearic acid | 2 | 2 | 2 | 2 | 2 | 2 | 2 | 2 |
| Antioxidant | 1 | 1 | 1 | 1 | 1 | 1 | 1 | 1 |
| Silica (i) | 40 | 40 | 40 | 15 | 60 | 40 | 40 | — |
| Silica (ii) | — | — | — | — | — | — | — | 40 |
| Carbon black | 0.5 | 1 | 1.8 | 0.4 | 1.5 | 1 | 1 | 1 |
| Process oil | 3 | 3 | 3 | 3 | 3 | 3 | 3 | 3 |
| Dihydrazide (i) | 0.5 | 0.5 | 0.5 | 0.5 | 0.5 | — | 1 | 0.5 |
| Dihydrazide (ii) | — | — | — | — | — | 0.5 | — | — |
| Silane coupling agent (i) | 1 | 1 | 1 | 1 | 1 | 1 | 1 | 1 |
| Silane coupling agent (ii) | — | — | — | — | — | — | — | — |
| Vulcanization accelerator | 1 | 1 | 1 | 1 | 1 | 1 | 1 | 1 |
| Sulfur | 2.5 | 2.5 | 2.5 | 2.5 | 2.5 | 2.5 | 2.5 | 2.5 |
| Dynamic magnification (index) | 80 | 82 | 85 | 71 | 97 | 84 | 83 | 79 |
| Evaluation | ◯ | ◯ | ◯ | ◯ | ◯ | ◯ | ◯ | ◯ |
| Durability (index) | 103 | 102 | 100 | 95 | 110 | 102 | 99 | 90 |
| Evaluation | ◯ | ◯ | ◯ | ◯ | ◯ | ◯ | ◯ | ◯ |
| Weather resistance | ◯ | ◯ | ◯ | ◯ | ◯ | ◯ | ◯ | ◯ |

(parts by weight)

TABLE 2

|  | Examples | | | | | | Comparison examples | | |
|---|---|---|---|---|---|---|---|---|---|
|  | 9 | 10 | 11 | 12 | 13 | 14 | 1 | 2 | 3 |
| NR | 90 | 80 | 90 | 100 | 100 | 100 | 100 | 100 | 100 |
| IR | 10 | 20 | — | — | — | — | — | — | — |
| BR | — | — | 10 | — | — | — | — | — | — |
| Zinc oxide | 5 | 5 | 5 | 5 | 5 | 5 | 5 | 5 | 5 |

TABLE 2-continued

|  | Examples | | | | | | Comparison examples | | |
| --- | --- | --- | --- | --- | --- | --- | --- | --- | --- |
|  | 9 | 10 | 11 | 12 | 13 | 14 | 1 | 2 | 3 |
| Stearic acid | 2 | 2 | 2 | 2 | 2 | 2 | 2 | 2 | 2 |
| Antioxidant | 1 | 1 | 1 | 1 | 1 | 1 | 1 | 1 | 1 |
| Silica (i) | 40 | 40 | 40 | 40 | 40 | 40 | 40 | 40 | 40 |
| Silica (ii) | — | — | — | — | — | — | — | — | — |
| Carbon black | 1 | 1 | 1 | 1 | 1 | 1 | 1 | — | 10 |
| Process oil | 3 | 3 | 3 | 3 | 3 | 3 | 3 | 3 | 3 |
| Dihydrazide (i) | 0.5 | 0.5 | 0.5 | 0.1 | 3 | 0.5 | — | 0.5 | 0.5 |
| Dihydrazide (ii) | — | — | — | — | — | — | — | — | — |
| Silane coupling agent (i) | 1 | 1 | 1 | 1 | 1 | — | 1 | 1 | 1 |
| Silane coupling agent (ii) | — | — | — | — | — | 1 | — | — | — |
| Vulcanization accelerator | 1 | 1 | 1 | 1 | 1 | 1 | 1 | 1 | 1 |
| Sulfur | 2.5 | 2.5 | 2.5 | 2.5 | 2.5 | 2.5 | 2.5 | 2.5 | 2.5 |
| Dynamic magnification (index) | 84 | 85 | 81 | 89 | 83 | 85 | 100 | 82 | 104 |
| Evaluation | ○ | ○ | ○ | ○ | ○ | ○ | x | ○ | x |
| Durability (index) | 97 | 96 | 91 | 102 | 98 | 105 | 100 | 107 | 88 |
| Evaluation | ○ | ○ | ○ | ○ | ○ | ○ | ○ | ○ | x |
| Weather resistance | ○ | ○ | ○ | ○ | ○ | ○ | ○ | x | ○ |

(parts by weight)

From the results of tables 1 and 2 above, the vulcanized body of the anti-vibration rubber composition of the examples has a low dynamic magnification (Kd100/Ks) and achieves both durability and weather resistance when compared with the vulcanized body of the anti-vibration rubber composition of comparison example 1 containing no dihydrazide compound.

Meanwhile, the vulcanized body of the anti-vibration rubber composition of comparison example 2 does not contain a carbon black, and is inferior in weather resistance to the vulcanized body of the anti-vibration rubber composition of examples and comparison example 1.

Further, the vulcanized body of the anti-vibration rubber composition of comparison example 3 contains more carbon blacks than the ratio specified in the present disclosure, and as seen in the vulcanized body of the anti-vibration rubber composition of examples, the achievement of low dynamic magnification and the improvement effect of durability are not recognized.

In addition, the above examples show specific embodiments of the present disclosure, but the above examples are merely illustrations and are not interpreted in a limited manner. Various modifications apparent to those skilled in the art are intended to be within the scope of the present disclosure.

INDUSTRIAL APPLICABILITY

The anti-vibration rubber composition of the present disclosure is preferably used as a material for a constituent member (anti-vibration rubber member) of an engine mount, a stabilizer bush, a suspension bush, a motor mount, a subframe mount and the like which are used in an automobile vehicle or the like. In addition, the anti-vibration rubber composition can also be used as a material for a constituent member (anti-vibration rubber member) of a seismic control (vibration control) and a seismic isolation device such as a vibration control damper on computer hard disks, a vibration control damper on general home appliances such as a washing machine, and a seismic control wall or a seismic control (vibration control) damper for construction in the field of construction and housing.

What is claimed is:

1. An anti-vibration rubber composition, comprising: a polymer comprising component (A); and components (B) to (E), wherein the mixing ratio of the components (B) and (C) is in a range of (B)/(C)=99/1 to 96/4 in weight ratio,
   (A) diene rubber;
   (B) silica;
   (C) carbon black;
   (D) silane coupling agent;
   (E) dihydrazide compound represented by general formula (1),

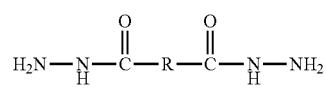

(1)

in general formula (1), R represents an alkylene group having 1 to 30 carbon atoms, a cycloalkylene group having 1 to 30 carbon atoms, or a phenylene group,
   the diene rubber containing a natural rubber (NR) as a main component is used, wherein the main component is 80% by weight or more of the diene rubber (A) is the natural rubber,
   a content of the silica (B) is 20 to 60 parts by weight with respect to 100 parts by weight of the diene rubber (A),
   a content of the carbon black (C) is 0.1 to 5 parts by weight with respect to 100 parts by weight of the diene rubber (A).

2. The anti-vibration rubber composition according to claim 1, wherein the silica (B) has a BET specific surface area of 30 to 320 m$^2$/g.

3. The anti-vibration rubber composition according to claim 1, wherein the silane coupling agent (D) is at least one selected from a sulfide-based silane coupling agent and a mercapto-based silane coupling agent.

4. The anti-vibration rubber composition according to claim 1, wherein a content ratio of the dihydrazide compound (E) is in a range of 0.01 to 5.0 parts by weight with respect to 100 parts by weight of the diene rubber (A).

5. The anti-vibration rubber composition according to claim 1, wherein the dihydrazide compound (E) is at least one selected from adipic acid dihydrazide and isophthalic acid dihydrazide.

6. An anti-vibration rubber member, comprising a vulcanized body of the anti-vibration rubber composition according to claim 1.

7. The anti-vibration rubber composition according to claim 1, wherein the diene rubber (A) comprises only the natural rubber.

\* \* \* \* \*